(12) United States Patent
Yang et al.

(10) Patent No.: US 10,824,839 B2
(45) Date of Patent: Nov. 3, 2020

(54) DISPLAY PANEL AND DISPLAY DEVICE INCLUDING FINGERPRINT RECOGNITION REGION HAVING IMPROVED LIGHT TRANSMITTANCE

(71) Applicant: WUHAN TIANMA MICRO-ELECTRONICS CO., LTD., Wuhan (CN)

(72) Inventors: Xingxing Yang, Wuhan (CN); Yangzhao Ma, Wuhan (CN)

(73) Assignee: WUHAN TIANMA MICRO-ELECTRONICS CO., LTD., Wuhan (CN)

(*) Notice: Subject to any disclaimer, the term of this patent is extended or adjusted under 35 U.S.C. 154(b) by 0 days.

(21) Appl. No.: 16/239,464

(22) Filed: Jan. 3, 2019

(65) Prior Publication Data
US 2019/0138783 A1 May 9, 2019

(30) Foreign Application Priority Data
Jul. 27, 2018 (CN) .......................... 2018 1 0846104

(51) Int. Cl.
*G06K 9/00* (2006.01)
*G06F 3/041* (2006.01)

(52) U.S. Cl.
CPC .......... *G06K 9/0004* (2013.01); *G06F 3/0412* (2013.01)

(58) Field of Classification Search
CPC ............................ G06K 9/0004; G06F 3/0412
See application file for complete search history.

(56) References Cited

U.S. PATENT DOCUMENTS

| 2002/0054003 | A1* | 5/2002 | Kodate | G09G 3/3648 345/87 |
| 2017/0147850 | A1* | 5/2017 | Liu | G06K 9/00087 |
| 2017/0372113 | A1* | 12/2017 | Zhang | H01L 27/3234 |
| 2019/0294301 | A1* | 9/2019 | Zhao | G06F 3/0416 |

* cited by examiner

*Primary Examiner* — Stephen G Sherman
(74) *Attorney, Agent, or Firm* — Kilpatrick Townsend & Stockton, LLP (57) ABSTRACT

A display panel including a display region, repeating units are provided in the fingerprint recognition region of the display region, each repeating unit includes pixel units, and each pixel unit includes sets of sub-pixels; first and second signal lines are provided in the fingerprint recognition region, each set of sub-pixels is connected to one first signal line and one second signal line; for two adjacent sets of sub-pixels in one pixel unit, a spacing between the first signal line corresponding to one of the two adjacent sets of sub-pixels and the second signal line corresponding to the other is smaller than a spacing between the first signal line corresponding to a set of first sub-pixels and the second signal line corresponding to a set of second sub-pixels; the set of first sub-pixels and the set of second sub-pixels are closest to each other in two adjacent pixel units.

12 Claims, 8 Drawing Sheets

Fig. 11

DISPLAY PANEL AND DISPLAY DEVICE INCLUDING FINGERPRINT RECOGNITION REGION HAVING IMPROVED LIGHT TRANSMITTANCE

CROSS-REFERENCE TO RELATED APPLICATIONS

The present disclosure claims priority to Chinese Patent Application No. 201810846104.2, filed on Jul. 27, 2018, the content of which is incorporated herein by reference in its entirety.

FIELD

The present disclosure relates to the field of display technologies, and particularly, to a display panel and a display device.

BACKGROUND

For a display panel with a fingerprint recognition function, in order to better realize a full screen design and avoid a fingerprint recognition region from occupying a non-display region, at present, the display region can be multiplexed as the fingerprint recognition region by using an in-screen fingerprint technology.

However, based on the structure of the current display panel, light-transmission regions are arranged sparsely in the fingerprint recognition region, and the area of each of the light-transmission regions is relatively small, so that when fingerprint recognition is performed, the amount of light in the fingerprint recognition region reflected through a touch body is small, which results in a lower detection precision of fingerprint recognition, and the fingerprint may not be accurately recognized.

SUMMARY

In view of this, the present disclosure provides a display panel and a display device for centrally setting light-transmission regions in the fingerprint recognition region, thereby improving light transmittance in the fingerprint recognition region, and increasing fingerprint recognition precision.

In one embodiment of the present disclosure, a display panel is provided. The display panel includes a display region, and at least a portion of the display region is a fingerprint recognition region, a plurality of repeating units is provided in the fingerprint recognition region, each of the plurality of repeating units includes a plurality of pixel units, and each of the plurality of pixel units includes a plurality of sets of sub-pixels; a plurality of first signal lines and a plurality of second signal lines are provided in the fingerprint recognition region, each set of the plurality of sets of sub-pixels is connected to one of the plurality of first signal lines and one of the plurality of second signal lines; for two adjacent sets of the plurality of sets of sub-pixels in one of the plurality of the pixel units, a spacing between the first signal line corresponding to one of the two adjacent sets of the plurality of sets of sub-pixels and the second signal line corresponding to the other one of the two adjacent sets of the plurality of sets of sub-pixels is smaller than a spacing between the first signal line corresponding to a set of first sub-pixels and the second signal line corresponding to a set of second sub-pixels; and the set of first sub-pixels and the set of second sub-pixels are two sets of sub-pixels closest to each other in two adjacent pixel units respectively.

In one embodiment of the present disclosure, a display device is provided. The display device includes any one of the display panel provided in the present disclosure.

BRIEF DESCRIPTION OF DRAWINGS

Embodiments of the present disclosure, the accompanying drawings used in the embodiments are briefly described below. The drawings described below are merely a part of the embodiments of the present disclosure.

DESCRIPTION OF EMBODIMENTS

Embodiments of the present disclosure are described in details with reference to the drawings.

It should be clear that the described embodiments are merely part of the embodiments of the present disclosure rather than all of the embodiments.

The terms used in the embodiments of the present disclosure are merely for the purpose of describing embodiments, rather than limiting the present disclosure. The terms "a", "an", "the" and "said" in a singular form in the embodiments of the present disclosure and the attached claims are also intended to include plural forms thereof, unless noted otherwise.

It should be understood that the term "and/or" used in the context of the present disclosure is to describe a correlation relation of related objects, indicating that there may be three relations, e.g., A and/or B may indicate only A, both A and B, and only B. In addition, the symbol "/" in the context generally indicates that the relation between the objects before and after the "/" is an "or" relation.

It should be understood that although the terms 'first' and 'second' may be used in the present disclosure to describe signal lines, these signal lines should not be limited to these terms. These terms are used only to distinguish the signal lines from one another. For example, without departing from the scope of the embodiments of the present disclosure, a first signal line may also be referred to as a second signal line. Similarly, the second signal line may also be referred to as the first signal line.

Figure 1:
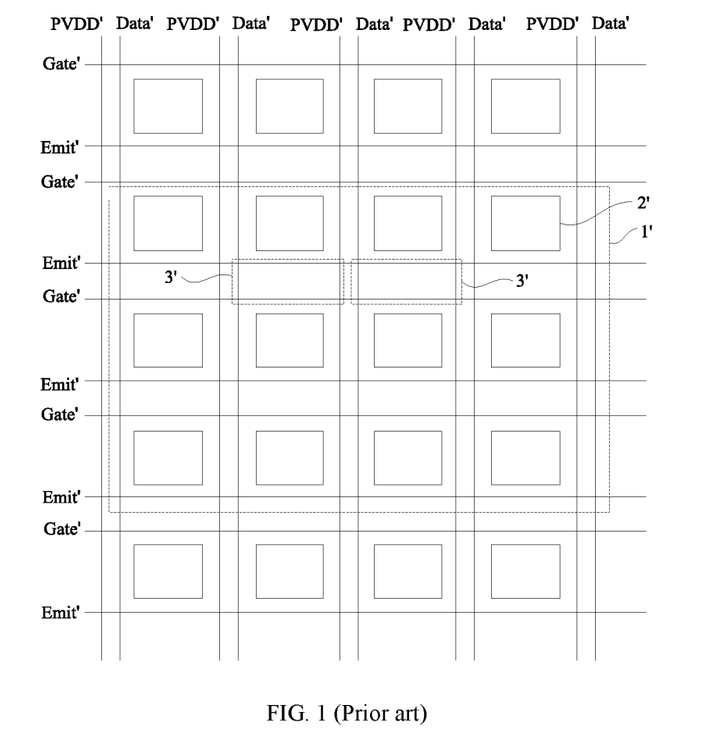
FIG. 1 is a structural schematic diagram showing a display panel in the related art.

FIG. 1 is a structural schematic diagram showing a display panel in the related art. As shown in FIG. 1, a display region of the display panel includes a fingerprint recognition region 1' provided with a plurality of pixel circuits 2' in a matrix arrangement. Each row of the pixel circuits 2' corresponds to a gate line Gate' extending in a row direction and a light-emitting control signal line Emit' extending in the row direction. Each column of the pixel circuits 2' corresponds to a data line Data' extending in a column direction and a power supply signal line PVDD' extending in the column direction. The light-emitting control signal line Emit' corresponding to the previous row of pixel circuits 2' in the two adjacent rows of pixel circuits 2', the gate line Gate' corresponding to the subsequent row of pixel circuits, the data line Data' corresponding to the previous column of pixel circuit 2' in the two adjacent columns of pixel circuits 2' and the power supply signal line PVDD' corresponding to the pixel circuit 2' of the subsequent column of the pixel circuits 2' together define a light-transmission region 3'. When fingerprint recognition is performed, the light reflected by a touch body (such as a finger) is emitted into a light-sensing fingerprint recognition unit via the light-transmission region 3', thereby recognizing the fingerprint.

However, in an existing arrangement, the arrangement of the light-transmission regions 3' in the fingerprint recognition region 1' is relatively sparse, and the area of each of the light-transmission regions 3' is relatively small, so that the amount of light reflected into the fingerprint recognition region 1' via the touch body is small when fingerprint recognition is performed, resulting in a lower detection precision of fingerprint recognition.

Figure 2:
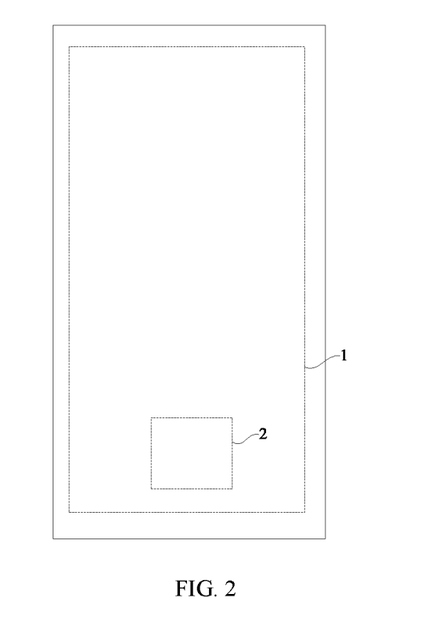
FIG. 2 is a structural schematic diagram showing a display panel according to an embodiment of the present disclosure.
Figure 3:
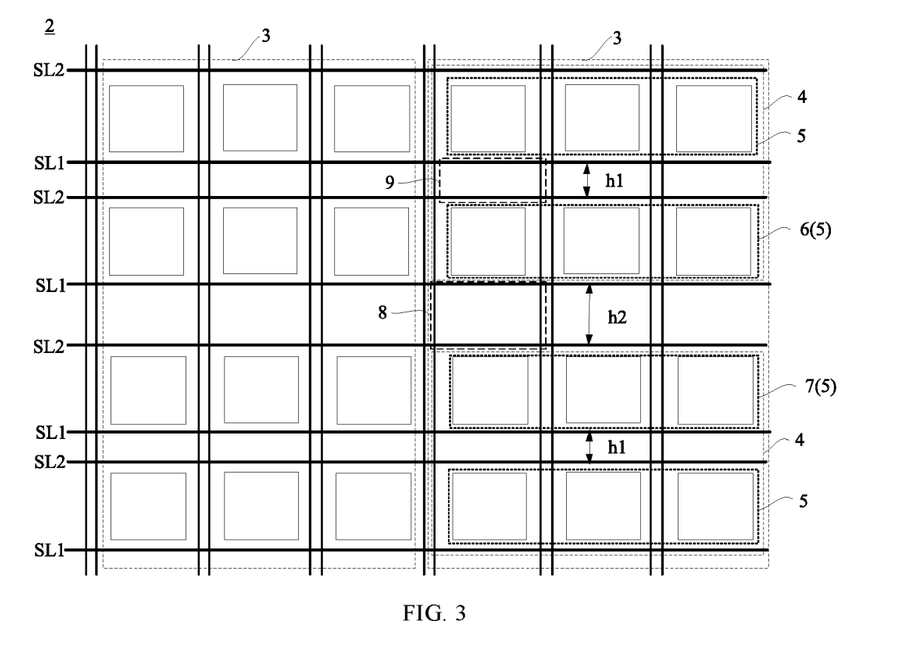
FIG. 3 is a structural schematic diagram showing a repeating unit according to an embodiment of the present disclosure.

Based on this, an embodiment of the present disclosure provides a display panel. As shown in FIGS. 2 and 3, FIG. 2 is a structural schematic diagram showing a display panel according to an embodiment of the present disclosure; and FIG. 3 is a structural schematic diagram showing a repeating unit according to an embodiment of the present disclosure. The display panel includes a display region 1. At least part of the display region 1 is a fingerprint recognition region 2 provided with a plurality of repeating units 3 therein. Each of the plurality of repeating units 3 includes a plurality of pixel units 4, and each of the plurality of pixel units 4 includes a plurality of sets of sub-pixels 5.

The fingerprint recognition region 2 is further provided with a plurality of first signal lines SL1 and a plurality of second signal lines SL2. Each of the sets of sub-pixels 5 is connected to one of the plurality of first signal lines SL1 and one of the plurality of second signal lines SL2 (not shown). Further, a region defined by the first signal line SL1 corresponding to the previous set of sub-pixels 5 in the two adjacent sets of sub-pixels 5 and the second signal line SL2 corresponding to the subsequent set of sub-pixels 5 is a region through which light is transmitted.

For the two adjacent sets of sub-pixels 5 in one pixel unit 4, a spacing h1 between the first signal line SL1 corresponding to one set of sub-pixels 5 and the second signal line SL2 corresponding to the other set of sub-pixels 5 is smaller than a spacing h2 between the first signal line SL1 corresponding to a first set of sub-pixels 6 and the second signal line SL2 corresponding to a second set of sub-pixels 7. The first set of sub-pixels 6 and the second set of sub-pixels 7 are respectively two sets of sub-pixels 5 closest to each other in two adjacent pixel units 4.

In the display panel according to the embodiments of the present disclosure, since the spacing h2 between the first signal line SL1 corresponding to the first set of sub-pixels 6 and the second signal line SL2 corresponding to the second set of sub-pixels 7 is different from the spacing h1 between the first signal line SL1 corresponding to one set of sub-pixels 5 in the two adjacent sets of sub-pixels 5 and the second signal line SL2 corresponding to the other set of sub-pixels 5 in the two adjacent sets of sub-pixels 5, there may have two types of light-transmission regions defined by the first signal line SL1 and the second signal line SL2 in the fingerprint recognition region 2: one is a first-type light-transmission region 8 defined by the first signal line SL1 of the first set of sub-pixels 6 and the second signal line SL2 of the second set of sub-pixels 7; the other is a second-type light-transmission region 9 defined by the other first signal line SL1 and the other second signal line SL2. Moreover, since the area of the first-type light-transmission region 8 is larger than the area of the second-type light-transmission region 9.

Compared with the related art, in the embodiments of the present disclosure, by reducing the area of the other light-transmission regions, the light-transmission regions between the first pixel unit 11 and the second pixel unit 12 are concentrated to form a first-type light-transmission region 8 having a larger area. The first-type light-transmission region 8 is further provided with a light-sensing fingerprint recognition unit such as a light-sensing sensor for performing fingerprint recognition, so that when the touch body such as a finger touches the display panel, the light reflected by the touch body can be concentrated into the light-sensing fingerprint recognition unit through the first-type light-transmission region 8, thereby increasing the amount of reflected light received by the light-sensing fingerprint recognition unit and thus increasing the fingerprint recognition precision.

Figure 4:
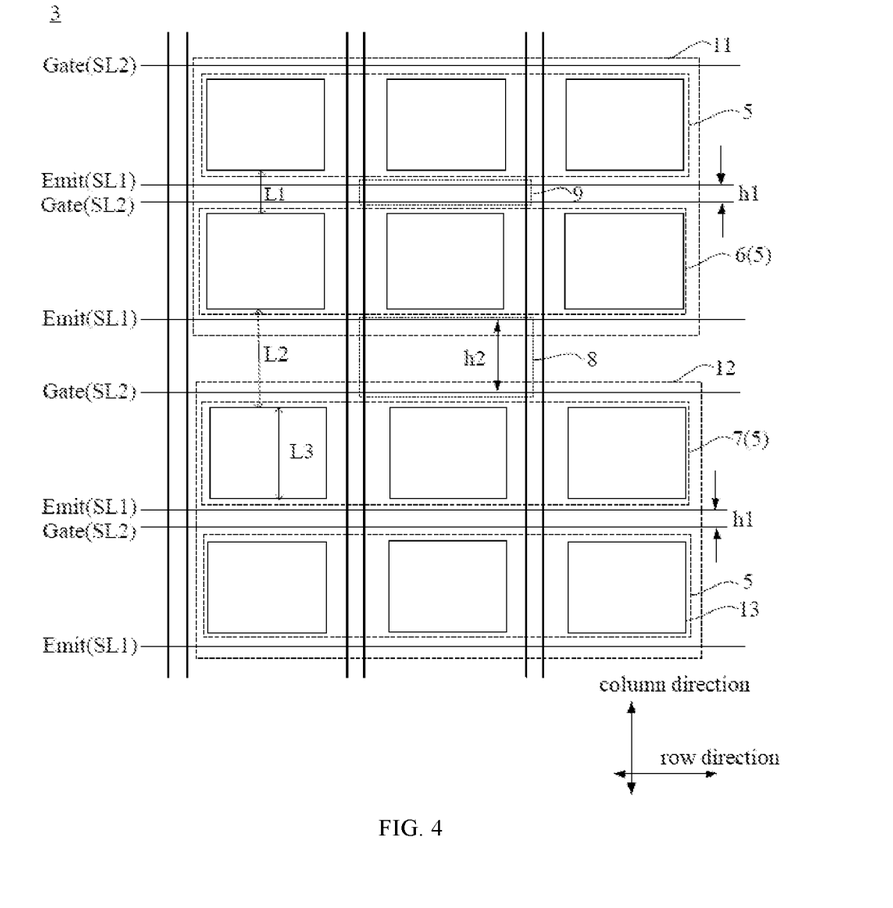
FIG. 4 is a structural schematic diagram showing a repeating unit according to another embodiment of the present disclosure.
Figure 6:
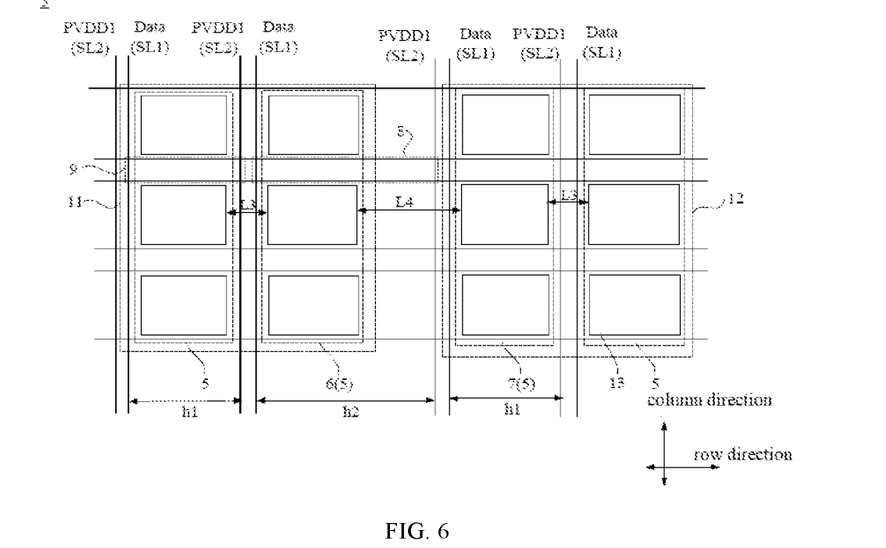
FIG. 6 is a structural schematic diagram showing a repeating unit according to still another embodiment of the present disclosure.
Figure 7:
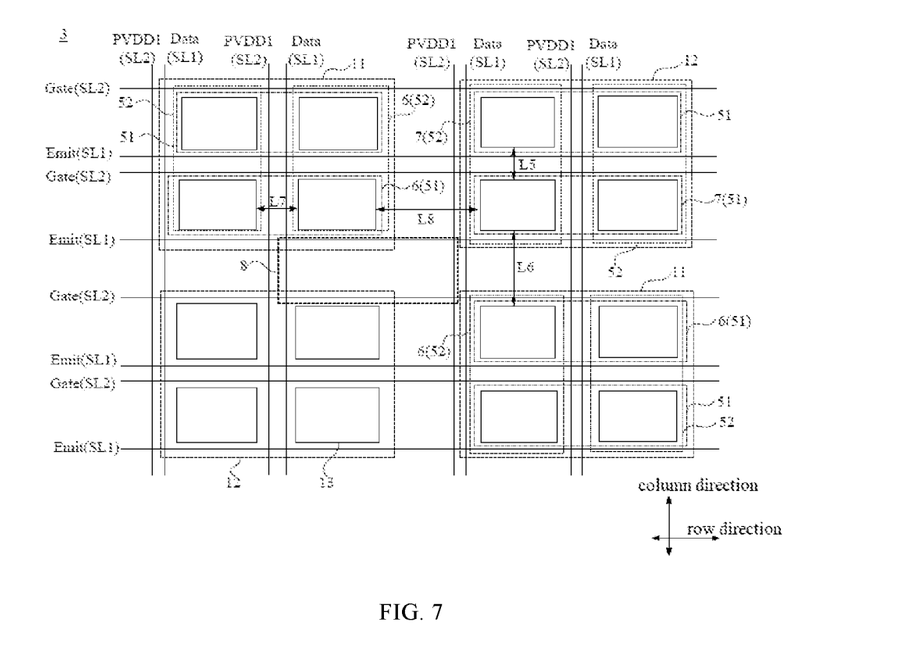
FIG. 7 is a structural schematic diagram showing a repeating unit according to still another embodiment of the present disclosure.

In an embodiment, as shown in FIGS. 4, 6 and 7, FIG. 4 is a structural schematic diagram showing a repeating unit according to another embodiment of the present disclosure; FIG. 6 is a structural schematic diagram showing a repeating unit according to still another embodiment of the present disclosure; and FIG. 7 is a structural schematic diagram showing a repeating unit according to still another embodiment of the present disclosure. The repeating unit 3 includes a first pixel unit 11 and a second pixel unit 12. The first pixel unit 11 and the second pixel unit 12 can be symmetrical relative to the row direction and/or column direction.

Referring to FIG. 4, each of the repeating units 3 includes a first pixel unit 11 and a second pixel unit 12. The first pixel unit 11 and the second pixel unit 12 are symmetrical relative to the row direction. Each of the sets of sub-pixels 5 in the first pixel unit 11 and the second pixel unit 12 includes a plurality of pixel circuits 13 arranged in the row direction.

In the repeating unit 3 of such a structure, each of the plurality of first signal lines SL1 is a light-emitting control signal line Emit, and each of the plurality of light-emitting control signal lines Emit is connected to the pixel circuit 13 of one set of sub-pixels 5 (not shown), and the light-emitting control signal line Emit is configured to provide an light-emitting control signal to the corresponding pixel circuit 13; each of the plurality of second signal line SL2 is a gate line Gate, and each of the plurality of gate lines Gate is connected to the pixel circuit 13 of one set of sub-pixels 5 (not shown), and the gate line Gate is configured to provide a scan signal to the corresponding pixel circuit 13. Moreover, a spacing between the pixel circuits 13 of any two adjacent sets of sub-pixels 5 in the column direction in the first pixel unit 11 and the second pixel unit 12 is L1, and a spacing between the pixel circuits 13 in the first set of sub-pixels 6 and the second set of sub-pixels 7 is L2, and L2>L1.

In this arrangement, increasing of the spacing L2 between the pixel circuits 13 in the first set of sub-pixels 6 and the second set of sub-pixels 7 is realized by reducing the spacing L1 between the pixel circuits 13 of each two adjacent sets of sub-pixels 5 in the first pixel unit 11 and the second pixel unit 12. On the one hand, the spacing h2 between the light-light-emitting control signal line Emit connected to the first set of sub-pixels 6 and the gate line Gate connected to the second set of sub-pixels 7 is increased, and, on the other hand, the width of the region where no pixel circuit 13 is arranged between the first pixel unit 11 and the second pixel unit 12 is increased, that is, the area of the region not shielded by metal traces between the first pixel unit 11 and the second pixel unit 12 is increased. A larger amount of reflected light can be ensured to pass through the part of region when the fingerprint recognition is performed, that is, the reflected light is emitted into the light-sensing fingerprint recognition unit through the first-type light-transmission region 8. For example, when L2 is increased by 6 μm compared to L1, the light transmittance in the embodiments of the present disclosure can be increased by about 23% compared to the light transmittance in the related art.

In an embodiment, referring to FIG. 4, it is assumed that the length of the pixel circuit 13 in the column direction is L3, so that L1 and L2 can satisfy:

$$\tfrac{1}{5} \times L3 \le L1 \le \tfrac{1}{4} \times L3, \text{ and } \tfrac{1}{4} \times L3 \le L2 \le \tfrac{1}{3} \times L3.$$

The minimum value of L1 is set to be $\tfrac{1}{5} \times L3$ to avoid a too small L1, thereby avoiding the pixel circuits 13 in the first pixel unit 11 and the second pixel unit 12 and the signal lines connected thereto being arranged too tightly, thus further avoiding mutual interference of the signals transmitted in the signal line. The maximum value of L2 is set to be $\tfrac{1}{4} \times L3$ to avoid a too large L1, thereby avoiding a too small area of the first-type light-transmission region 8 formed between the first pixel unit and the second pixel unit 12. Similarly, the minimum value of L2 is set to be $\tfrac{1}{4} \times L3$ to avoid a too small L2, thereby avoiding a too small L2, and thus avoiding a too small area of the first-type light-transmission region 8, and the maximum value of L2 is set to be $\tfrac{1}{3} \times L3$ to avoid a too large area of the first-type light-transmission region 8, so as to avoid the pixel circuits 13 in the first pixel unit 11 and the second pixel unit 12 and the signal lines connected thereto from being arranged too tightly.

In an embodiment, the first pixel unit 11 and the second pixel unit 12 may respectively include two sets of sub-pixels 5, so that when the number of sets of sub-pixels 5 included in the fingerprint recognition region 2 is constant, the set of pixels 5 can be partitioned into a larger number of repeating units 3, that is, the number of the first-type transparent regions formed in the fingerprint recognition region 2 is increased, thereby ensuring that more light is emitted into the light-sensing fingerprint recognition unit through the first-type transmission region.

Figure 5:
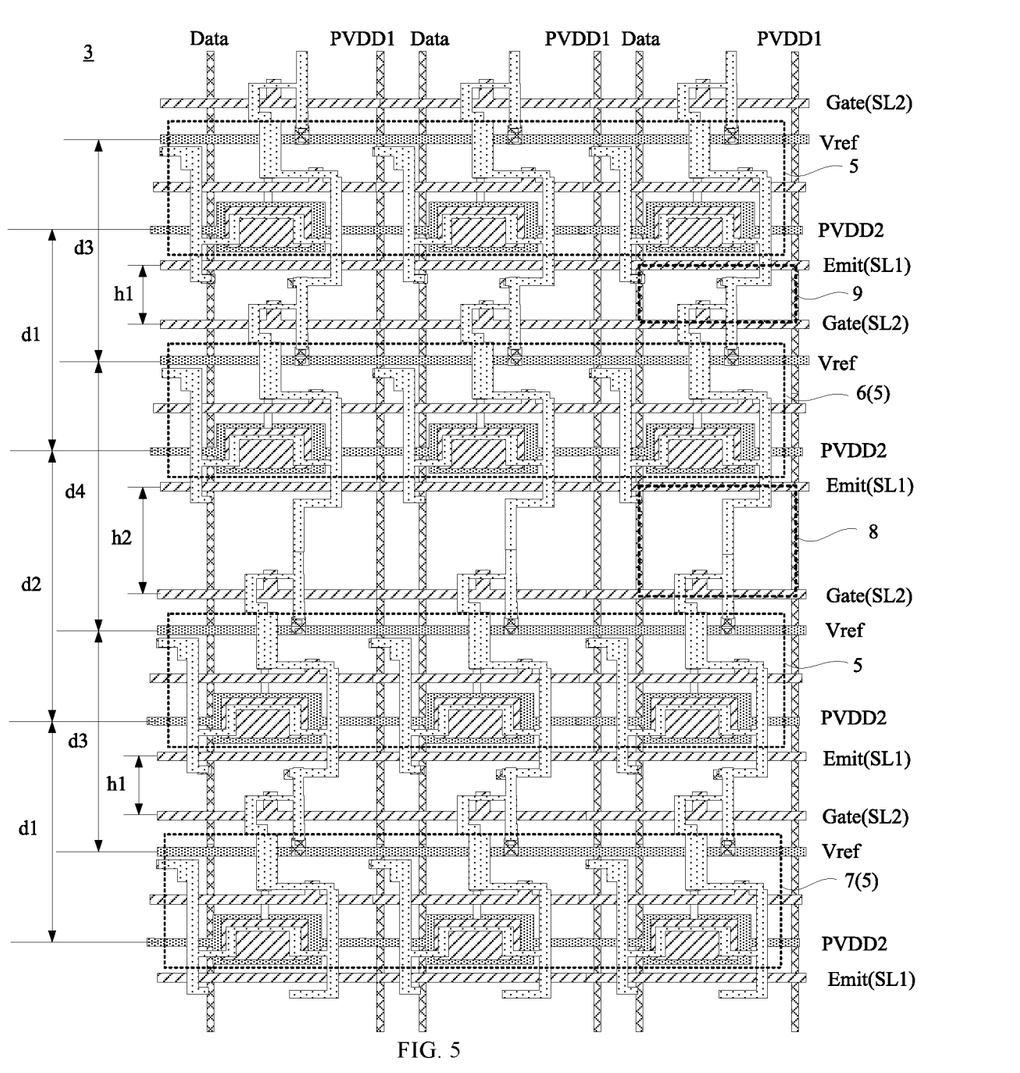
FIG. 5 is a structural schematic diagram showing a layout of a repeating unit according to an embodiment of the present disclosure.

In addition, it can be understood that the pixel circuit 13 may be required to be driven by the power supply signal and the initial potential signal in addition to the scan signal provided by the gate line Gate and the light-emitting control signal provided by the light-emitting control signal line Emit. Based on this, as shown in FIG. 5, FIG. 5 is a structural schematic diagram showing a layout of a repeating unit according to an embodiment of the present disclosure. The fingerprint recognition region 2 is further provided with a fixed potential signal line PVDD2 and an initial potential signal line Vref. The fixed potential signal line PVDD2 extends in the row direction, and each of the fixed potential signal lines PVDD2 is connected to the pixel circuit 13 of one set of sub-pixels 5. The fixed potential signal line PVDD2 is further connected to the power supply signal line PVDD1 extending in the column direction. The fixed potential signal line PVDD2 and the power supply signal line PVDD1 are arranged in an intersecting manner and both configured to supply a power supply signal to the pixel circuit 13. The initial potential signal line Vref extends in the row direction, and each of the initial potential signal lines Vref is connected to the pixel circuit 13 of one set of sub-pixels 5. The initial potential signal line Vref is configured to supply the initial potential signal to the pixel circuit 13.

In the related art, since the pixel circuits 13 in the fingerprint recognition region 2 are arranged in a matrix, the spacing between the two adjacent fixed potential signal lines PVDD2 is equal to the spacing between the two adjacent initial potential signal lines Vref. However, in the embodiments of the present disclosure, since the set location of the pixel circuit 13 in the fingerprint recognition region 2 is adjusted, the spacing between the pixel circuits 13 of any two adjacent sets of sub-pixels 5 in the column direction in the first pixel unit 11 and the second pixel unit 12 is smaller than the spacing between the pixel circuits 13 in the first set of sub-pixels 6 and the second set of sub-pixels 7. Therefore, in order to reduce the spacing between the pixel circuit 13 and the corresponding fixed potential signal line PVDD2 or the initial potential signal line Vref, reduce the length of the connection traces, and reduce signal attenuation, the set locations of the fixed potential signal line PVDD2 and the initial potential signal line Vref can be further adjusted. It may be required to satisfy the following condition: the spacing d1 between the two fixed potential signal lines PVDD2 corresponding to two adjacent sets of sub-pixels 5 in the column direction in the first pixel unit 11 and the second pixel unit 12 is smaller than the spacing d2 between two fixed potential signal lines PVDD2 corresponding to the first set of sub-pixels 6 and the second set of sub-pixels 7; and the spacing d3 between the two initial potential signal lines Vref corresponding to two adjacent sets of sub-pixels 5 in the column direction in the first pixel unit 11 and the second pixel unit 12 is smaller than the spacing d4 between the two initial potential signal lines Vref corresponding to the first set of sub-pixels 6 and the second set of sub-pixels 7.

Referring to FIG. 6, each of the repeating units 3 includes a first pixel unit 11 and a second pixel unit 12. The first pixel unit 11 and the second pixel unit 12 are symmetrical relative to the column direction. Each of the sets of sub-pixels 5 in the first pixel unit 11 and the second pixel unit 12 includes a plurality of pixel circuits 13 arranged in the column direction.

In the repeating unit 3 of such a structure, each of the plurality of first signal lines SL1 is a data line Data, and each of the plurality of data lines Data is connected to the pixel circuit 13 of one set of sub-pixels 5 (not shown), and is configured to provide a data signal to the corresponding pixel circuit 13; and each of the plurality of second signal lines SL2 is a power supply signal line PVDD, and each of the power supply signal lines PVDD1 is connected to the pixel circuit 13 of one set of sub-pixels 5 (not shown), and is configured to provide a power supply signal to the corresponding pixel circuit 13. Moreover, a spacing between the pixel circuits 13 of any two adjacent sets of sub-pixels 5 in the row direction in the first pixel unit 11 and the second pixel unit 12 is L3, a spacing between the pixel circuits 13 in the first set of sub-pixels 6 and the second set of sub-pixels 7 is L4, and L4>L3.

In this arrangement, increasing of the spacing L4 between the pixel circuits 13 in the first set of sub-pixels 6 and the second set of sub-pixels 7 is realized by reducing the spacing L3 between the pixel circuits 13 of each of the two sets of sub-pixels 5 adjacent in the row direction in the first pixel unit 11 and the second pixel unit 12. On the one hand, the spacing h2 between the data line Data connected to the first set of sub-pixels 6 and the power supply signal line PVDD1 connected to the second set of sub-pixels 7 is increased and, on the other hand, the length of the region where no pixel circuit 13 is arranged between the first pixel unit 11 and the second pixel unit 12 is increased, that is, the area of the region not shielded by metal traces between the first pixel unit 11 and the second pixel unit 12 is increased. A larger amount of reflected light can be ensured to pass through the part of region when the fingerprint recognition is performed, that is, the reflected light is emitted into the light-sensing fingerprint recognition unit through the first-type light-transmission region 8.

Referring to FIG. 7, each of the repeating units 3 includes two first pixel units 11 and two second pixel units 12. The first pixel units 11 and the second pixel units 12 are symmetrical relative to both the row direction and the column direction. The first pixel unit 11 and the second pixel unit 12 each include a plurality of pixel circuits 13 arranged in a matrix. In the first pixel unit 11 and the second pixel unit 12, a plurality of pixel circuits 13 arranged in the row direction constitutes a first-type set of sub-pixels 51, and a plurality of pixel circuits 13 arranged in the column direction constitutes a second-type set of sub-pixels 52.

In the repeating unit 3 of such a structure, the first signal line SL1 includes a light-emitting control signal line Emit and a data line Data. The light-emitting control signal line Emit is connected to the pixel circuit 13 of the first-type set of sub-pixels 51, and the data line Data is connected to the pixel circuit 13 of the second-type set of sub-pixels 52. The second signal line SL2 includes a gate line Gate and a power supply signal line PVDD1. The gate line Gate is connected to the pixel circuit 13 of the first-type set of sub-pixels 51, and the power supply signal line PVDD1 is connected to the pixel circuits 13 of the second-type set of sub-pixels 52.

For the first-type set of sub-pixels 51, the spacing between the pixel circuits 13 of any two adjacent first sets of sub-pixels 51 in the row direction in the first pixel unit 11 and the second pixel unit 12 is L5, the spacing between the pixel circuits 13 in the first set of sub-pixels 6 and the second set of sub-pixels 7 is L6, and L6>L5.

For the second-type set of sub-pixels 52, the spacing between the pixel circuits 13 of any two adjacent second sets of sub-pixels 52 in the column direction in the first pixel unit 11 and the second pixel unit 12 is L7, the spacing between the pixel circuits 13 in the first set of sub-pixels 6 and the second set of sub-pixels 7 is L8, and L8>L7.

In this arrangement, the spacing L6 between the pixel circuits 13 in the first set of sub-pixels 6 and the second set of sub-pixels 7 corresponding to the first set of sub-pixels 51 is increased, and the spacing L8 between the pixel circuits 13 in the first set of sub-pixels 6 and the second set of sub-pixels 7 corresponding to the second set of sub-pixels 52 is increased. Therefore, on the one hand, the spacing between the light-emitting control signal line Emit connected to the first set of sub-pixels 6 and the gate line Gate connected to the second set of sub-pixels 7, and the spacing between the data line Data connected to the first set of sub-pixels 6 and the power supply signal line PVDD1 connected to the second set of sub-pixels 7 are increased, that is, the length and width of the first-type light-transmission region 8 are increased and, on the other hand, the area of the region where no pixel circuit 13 is arranged between the first pixel unit 11 and the second pixel unit 12 is increased, therefore, the area of the region not shielded by metal traces between the first pixel unit 11 and the second pixel unit 12 is increased.

Figure 8:
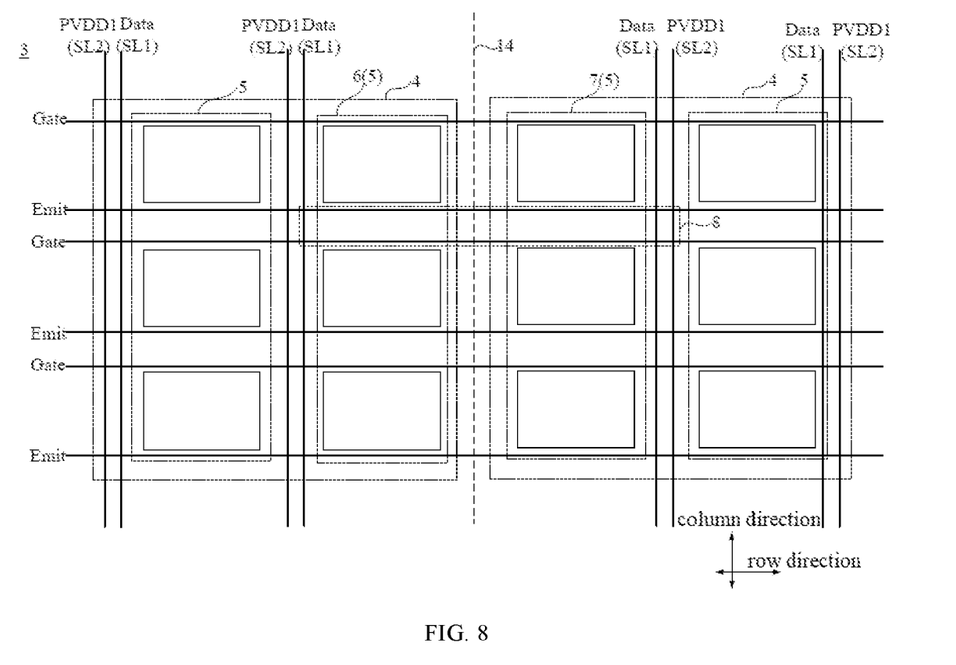
FIG. 8 is a structural schematic diagram showing a repeating unit according to still another embodiment of the present disclosure.

In an embodiment, as shown in FIG. 8, FIG. 8 is a structural schematic diagram showing a repeating unit according to still another embodiment of the present disclosure. The repeating unit 3 includes two pixel units 4. Each of the pixel units 4 includes n sets of sub-pixels 5. Each of the sets of sub-pixels 5 includes a plurality of pixel circuits 13 arranged in the column direction, and n≥2.

Each of the plurality of first signal lines SL1 is a data line Data, and each of the plurality of data lines Data is connected to the pixel circuit 13 of one set of sub-pixels 5. Each of the plurality of second signal lines SL2 is a power supply signal line PVDD1, and each of the plurality of power supply signal lines PV is connected to the pixel circuits 13 of one set of sub-pixels 5.

In the two pixel units 4, a data line Data in one pixel unit 4 and a data line Data in the other pixel unit 4 are symmetrical relative to a first symmetry axis 14, and a power supply signal line PVDD1 in one pixel unit 4 and a power supply signal line PVDD1 in the other pixel unit 4 are symmetrical relative to the first symmetry axis 14. The first symmetry axis 14 extends in the column direction and is located between the two pixel units 4. Moreover, the data line Data and the power supply signal line PVDD1 corresponding to the set of sub-pixels 5 are located at a side of the set of sub-pixels 5 away from the first symmetry axis 14. Meanwhile, the data line Data and the power supply signal line PVDD1 in the two pixel units 4 can be designed in a "mirror" configuration.

Compared with the related art, by symmetrically arranging the data line Data and the power supply signal line PVDD1 in the two pixel units 4, the data line Data and the power supply signal line PVDD1 corresponding to the second set of sub-pixels 7 can be located at a side of the second set of sub-pixels 7 away from the first set of sub-pixels 6, thereby increasing the spacing between the data line Data corresponding to the first set of sub-pixels 6 and the power supply signal line PVDD1 corresponding to the second set of sub-pixels 7, that is, the length of the first-type light-transmission regions 8 in the row direction is increased, so that the area of the first-type light-transmission regions 8 is further increased.

Figure 9:
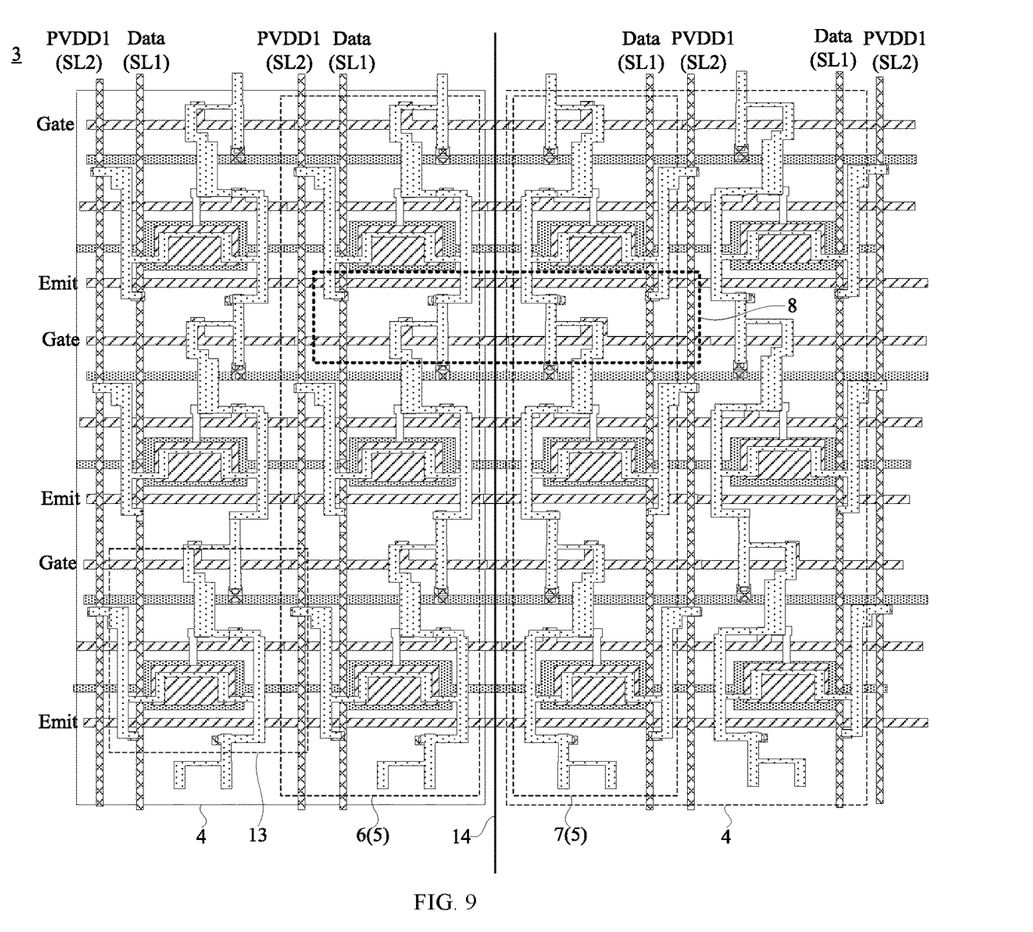
FIG. 9 is a structural schematic diagram showing another layout of a repeating unit according to an embodiment of the present disclosure.

Further, as shown in FIG. 9, FIG. 9 is a structural schematic diagram showing another layout of a repeating unit according to an embodiment of the present disclosure. In two pixel units 4, a pixel circuit 13 in one pixel unit 4 and a pixel circuit 13 in the other pixel unit 4 are symmetrical relative to the first symmetry axis 14, i.e., the pixel circuits 13 in the two pixel units 4 can also be designed in a "mirror" configuration.

With the arrangement of the pixel circuits 13 in the related art, for the metal traces and though holes in the first-type light-transmission regions 8 in the pixel circuit 13, the set location of the metal traces and though holes of the pixel circuit 13 in the first set of sub-pixels 6, and the set location of the metal traces and though holes of the pixel circuit 13 in the second set of sub-pixels 7 are relatively sparse in the first-type light-transmission regions 8, resulting a poor concentration of the light-transmission regions in the first-type light-transmission regions 8. Referring to FIG. 9, in the embodiments of the present disclosure, by symmetrically arranging the pixel circuits 13 of the two pixel units 4, the metal traces and through holes of the pixel circuits 13 in the first-type light-transmission regions 8 can be concentrated in the middle region, so as to improve the concentration of regions in the first-type light-transmission region 8 that is not shielded by the metal traces and the through holes.

Moreover, since the data line Data and the power supply signal line PVDD1 in the two pixel units 4 are symmetrically arranged, if the arrangement of the pixel circuit 13 in the related art is adopted, connecting the pixel circuit 13 to the corresponding data line Data and the power supply signal line PVDD1 may require a longer connection trace. In the embodiments of the present disclosure, by further symmetrically arranging the pixel circuits 13, the length of the connection trace between the pixel circuit 13 and the corresponding data line Data or the power supply signal line PVDD1 can be reduced, thereby reducing signal attenuation.

In an embodiment, each pixel unit 4 may include only two sets of sub-pixels 5, i.e., n=2. In this way, when the number of sets of sub-pixels 5 included in the fingerprint recognition region 2 is constant, the set of sub-pixels 5 can be partitioned into a larger number of repeating units 3, that is, the number of the first-type light-transmission regions formed in the fingerprint recognition region 2 is increased, further ensuring that a larger amount of light is emitted into the light-sensing fingerprint recognition unit via the first-type light-transmission region.

Figure 10:
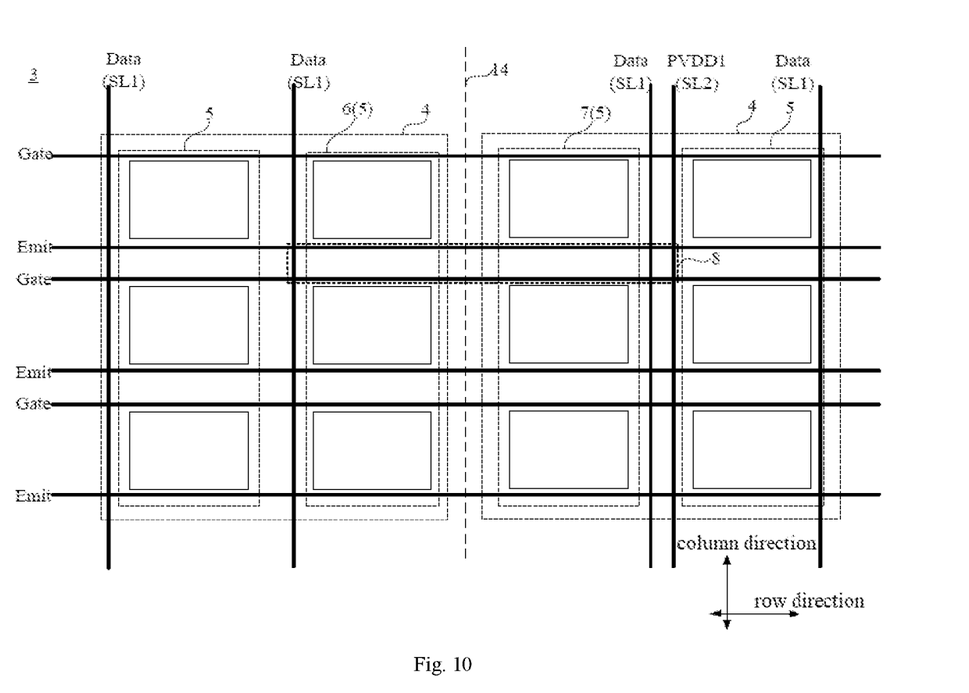
FIG. 10 is a structural schematic diagram showing a repeating unit according to still another embodiment of the present disclosure.

In an embodiment, as shown in FIG. 10, FIG. 10 is a structural schematic diagram showing a repeating unit according to still another embodiment of the present disclosure. The repeating unit 3 includes two pixel units 4, and each of the pixel units 4 includes n sets of sub-pixels 5. Each of the sets of sub-pixels 5 includes a plurality of pixel circuits 13 arranged in the column direction, and n≥2.

Further, each of the plurality of first signal lines SL1 is a data line Data, each of the plurality of data lines Data is connected to the pixel circuit 13 of one set of sub-pixels 5. The second signal line SL2 is a power supply signal line PVDD1, and the pixel circuits 13 of 2n sets of sub-pixels 5 are only connected to one power supply signal line PVDD1. In the two pixel units 4, a data line Data in one pixel unit 4 and a data line Data in the other pixel unit 4 are symmetrical relative to a first symmetry axis 14. The first symmetry axis 14 extends in a column direction, and is located between the two pixel units 4. The data lines Data corresponding to the set of sub-pixels 5 is located at a side of the set of sub-pixels 5 away from the first symmetry axis 14. Meanwhile, the data lines Data in the two pixel units 4 can be designed in a "mirror" configuration.

The pixel circuits 13 of the 2n sets of sub-pixels 5 are connected to only one power supply signal line PVDD1, so that the number of power supply signal lines PVDD1, set in the fingerprint recognition region 2 can be reduced, thereby reducing the shielding effect of the power supply signal line PVDD1 to the light reflected by the touch body.

Further, in order to concentrate the metal traces and through holes of the pixel circuit 13 in the first-type light-transmission region 8 in the middle region, the concentration of the regions not shielded by the metal traces and though holes in the first-type light-transmission region 8 is improved. The pixel circuits 13 can also be designed in a "mirror" configuration, that is, in the two pixel units 4, a pixel circuit 13 in one pixel unit 4 and a pixel circuit 13 in the other pixel unit 4 are symmetrical relative to the first symmetry axis 14.

In an embodiment, in order to increase the number of the first-type light-transmission regions formed in the fingerprint recognition region 2, each of the pixel units 4 may include only two sets of sub-pixels 5, that is, n=2.

Figure 11:
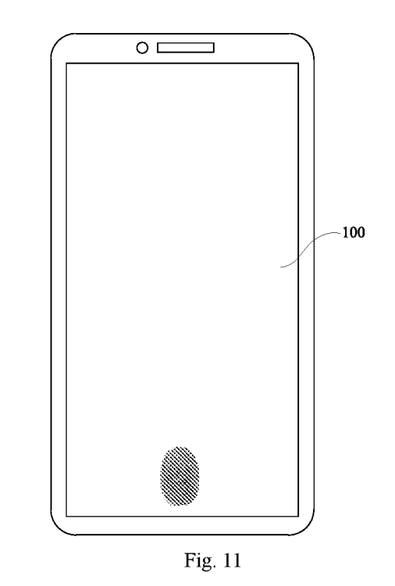
FIG. 11 is a structural schematic diagram showing a display device according to an embodiment of the present disclosure.

An embodiment of the present disclosure further provides a display device. FIG. 11 is a structural schematic diagram showing a display device according to an embodiment of the present disclosure. The display device includes the display panel 100 described above. The specific structure of the display panel 100 has been described in detail in the above embodiments, which is not elaborated herein. The display device shown in FIG. 11 is merely illustrative, and the display device may be any electronic device having a display function such as a mobile phone, a tablet computer, a laptop computer, an electronic paper book, or a television.

Since the display device provided by the embodiments of the present disclosure includes the above display panel 100, with the display device, the light-transmission regions between the first pixel unit and the second pixel unit in the fingerprint recognition region can be concentrated to form a light transmission region having a larger area. In this way, when the touch body touches the display panel, the light reflected by the touch body can be concentrated to be emitted from the light-transmission region, thereby increasing the fingerprint recognition precision.

What is claimed is:

1. A display panel, comprising:
    a display region, wherein at least a portion of the display region is a fingerprint recognition region, a plurality of repeating units is provided in the fingerprint recognition region, each of the plurality of repeating units comprises a plurality of pixel units, and each of the plurality of pixel units comprises a plurality of sets of sub-pixels;
    a plurality of first signal lines and a plurality of second signal lines are provided in the fingerprint recognition region, each set of the plurality of sets of sub-pixels is connected to one of the plurality of first signal lines and one of the plurality of second signal lines;
    for two adjacent sets of the plurality of sets of sub-pixels in one of the plurality of the pixel units, a spacing between the first signal line corresponding to one of the two adjacent sets of the plurality of sets of sub-pixels and the second signal line corresponding to the other one of the two adjacent sets of the plurality of sets of sub-pixels is smaller than a spacing between the first signal line corresponding to a set of first sub-pixels and the second signal line corresponding to a set of second sub-pixels; and
    the set of first sub-pixels and the set of second sub-pixels are two sets of sub-pixels closest to each other in two adjacent pixel units respectively,
    wherein one of the plurality of repeating units comprises a first pixel unit and a second pixel unit, the first pixel unit and the second pixel unit are symmetrical relative to a row direction, each of the plurality of sets sub-pixels in the first pixel unit and the second pixel unit comprises a plurality of pixel circuits arranged in the row direction;
    each of the plurality of first signal lines is a light-emitting control signal line connected to the plurality of pixel circuits of one set of the plurality of sets of sub-pixels, and each of the plurality of second signal lines is a gate line connected to the plurality of pixel circuits of one set of the plurality of sets of sub-pixels; and a spacing between the pixel circuits of any two adjacent sets of the plurality of sets of sub-pixels in a column direction in the first pixel unit and the second pixel unit is L1, and a spacing between the pixel circuits in the set of first sub-pixels and the pixel circuits in the set of second sub-pixels is L2, and L2>L1.

2. The display panel according to claim 1, wherein a length of one of the plurality of pixel circuits in the column direction is L3, ⅕×L3≤L1≤¼×L3, and ¼×L3≤L2≤⅓×L3.

3. The display panel according to claim 1, wherein each of the first pixel unit and the second pixel unit comprises two sets of the plurality of sets of sub-pixels.

4. The display panel according to claim 1, wherein in the fingerprint recognition region, the display panel further comprises:

a plurality of fixed potential signal lines, wherein each of the plurality of fixed potential signal lines is connected to the pixel circuits of one set of the plurality of sets of sub-pixels; a spacing between two of the plurality of fixed potential signal lines corresponding to two adjacent sets of the plurality of sets of sub-pixels in the column direction in the first pixel unit and the second pixel unit is smaller than a spacing between two of the plurality of fixed potential signal lines corresponding to the set of first sub-pixels and the set of second sub-pixels; and a plurality of initial potential signal lines, wherein each of the plurality of initial potential signal lines is connected to the pixel circuits of one set of the plurality of sets of sub-pixels; a spacing between two of the plurality of initial potential signal lines corresponding to any two adjacent sets of the plurality of sets of sub-pixels in the column direction in the first pixel unit and the second pixel unit is smaller than a spacing between two of the plurality of initial potential signal lines corresponding to the set of first sub-pixels and the set of second sub-pixels.

5. A display device, comprising the display panel according to claim 1.

6. The display device according to claim 5, wherein a length of one of the plurality of pixel circuits in the column direction is L3, ⅕×L3≤L1≤¼×L3, and ¼×L3≤L2≤⅓×L3.

7. A display panel, comprising:

a display region, wherein at least a portion of the display region is a fingerprint recognition region, a plurality of repeating units is provided in the fingerprint recognition region, each of the plurality of repeating units comprises a plurality of pixel units, and each of the plurality of pixel units comprises a plurality of sets of sub-pixels;

a plurality of first signal lines and a plurality of second signal lines are provided in the fingerprint recognition region, each set of the plurality of sets of sub-pixels is connected to one of the plurality of first signal lines and one of the plurality of second signal lines;

for two adjacent sets of the plurality of sets of sub-pixels in one of the plurality of the pixel units, a spacing between the first signal line corresponding to one of the two adjacent sets of the plurality of sets of sub-pixels and the second signal line corresponding to the other one of the two adjacent sets of the plurality of sets of sub-pixels is smaller than a spacing between the first signal line corresponding to a set of first sub-pixels and the second signal line corresponding to a set of second sub-pixels;

the set of first sub-pixels and the set of second sub-pixels are two sets of sub-pixels closest to each other in two adjacent pixel units respectively, each of the plurality of repeating units comprises a first pixel unit and a second pixel unit that are symmetrical relative to a column direction, each of the plurality of sets of sub-pixels in the first pixel unit and the second pixel unit comprises a plurality of pixel circuits arranged in the column direction;

the plurality of first signal lines is a plurality of data lines, and each of the plurality of data lines is connected to the pixel circuits of one set of the plurality of sets of sub-pixels, the plurality of second signal lines is a plurality of power supply signal lines, and each of the plurality of power supply signal lines is connected to the pixel circuits of one set of the plurality of sets of sub-pixels; and a spacing between the pixel circuits of any two adjacent sets of the plurality of sets of sub-pixels in a row direction in the first pixel unit and the second pixel unit is L3, a spacing between the pixel circuits of the set of first sub-pixels and the set of second sub-pixels is L4, and L4>L3.

8. A display device, comprising the display panel according to claim 7.

9. The display device according to claim 8, wherein a length of one of the plurality of pixel circuits in the column direction is L3, ⅕×L3≤L1≤¼×L3, and ¼×L3≤L2≤⅓×L3.

10. A display panel, comprising:

a display region, wherein at least a portion of the display region is a fingerprint recognition region, a plurality of repeating units is provided in the fingerprint recognition region, each of the plurality of repeating units comprises a plurality of pixel units, and each of the plurality of pixel units comprises a plurality of sets of sub-pixels;

a plurality of first signal lines and a plurality of second signal lines are provided in the fingerprint recognition region, each set of the plurality of sets of sub-pixels is connected to one of the plurality of first signal lines and one of the plurality of second signal lines;

for two adjacent sets of the plurality of sets of sub-pixels in one of the plurality of the pixel units, a spacing between the first signal line corresponding to one of the two adjacent sets of the plurality of sets of sub-pixels and the second signal line corresponding to the other one of the two adjacent sets of the plurality of sets of sub-pixels is smaller than a spacing between the first signal line corresponding to a set of first sub-pixels and the second signal line corresponding to a set of second sub-pixels;

the set of first sub-pixels and the set of second sub-pixels are two sets of sub-pixels closest to each other in two adjacent pixel units respectively;

one of the plurality of repeating units comprises a first pixel unit and a second pixel unit, each of the plurality of repeating units comprises two first pixel units and two second pixel units, the two first pixel units and the two second pixel units are symmetrical relative to both a column direction and a row direction, each of the two first pixel units and the two second pixel units comprises a plurality of pixel circuits arranged in a matrix; in each of the two first pixel units and the two second pixel units, the plurality of pixel circuits arranged along the row direction constitutes a set of first-type sub-pixels, and the plurality of pixel circuits arranged along the column direction constitutes a set of second-type sub-pixels;

the plurality of first signal lines comprises a plurality of light-emitting control signal lines and a plurality of data lines, the plurality of light-emitting control signal lines is connected to the pixel circuits of the set of first-type sub-pixels, the plurality of data lines is connected to the pixel circuits of the set of second-type sub-pixels, the plurality of second signal lines comprises a plurality of gate lines and a plurality of power supply signal lines, the plurality of gate lines is connected to the pixel circuits of the set of first-type sub-pixels, and the plurality of power supply signal lines is connected to the pixel circuits of the set of second-type sub-pixels;

for the set of first-type sub-pixels, a spacing between the pixel circuits of any two adjacent sets of first-type sub-pixels in the row direction in the first pixel unit and the second pixel unit is L5, a spacing between the pixel circuits in the set of first sub-pixels and the set of second sub-pixels is L6, and L6>L5; and for the set of second-type sub-pixels, a spacing between the pixel circuits of any two adjacent sets of second-type sub-pixels in the column direction in the first pixel unit and the second pixel unit is L7, a spacing between the pixel circuits in the set of first sub-pixels and the set of second sub-pixels is L8, and L8>L7.

11. A display device, comprising the display panel according to claim 10.

12. The display device according to claim 11, wherein a length of one of the plurality of pixel circuits in the column direction is L3, $\frac{1}{5} \times L3 \leq L1 \leq \frac{1}{4} \times L3$, and $\frac{1}{4} \times L3 \leq L2 \leq \frac{1}{3} \times L3$.

* * * * *